3,234,262
PROCESS FOR PREPARING DIARYL CARBONATES
Raymond P. Kurkjy, Geneva, Switzerland, and Markus Matzner, Middlesex County, and Robert J. Cotter, New Brunswick, N.J., assignors to Union Carbide Corporation, a corporation of New York
No Drawing. Filed July 3, 1962, Ser. No. 208,672
9 Claims. (Cl. 260—463)

The present invention relates in general to the preparation of diaryl carbonates, and more particularly it relates to a novel anhydrous, catalytic process for reacting aryl monochloroformates inter se to form diaryl carbonates.

Diaryl carbonates, typified by diphenyl carbonate, are well known compounds which heretofore have been prepared by a variety of chemical reactions. For example it has been proposed to react phenols with phosgene in the presence of equimolar quantities of organic tertiary bases to bind the hydrogen chloride produced as a by-product. Aqueous sodium hydroxide has also been employed to neutralize the hydrogen chloride in such reactions.

It has further been proposed to obtain diaryl carbonates by reacting an appropriate aryl chloroformate with pyridine and water. Insofar as is presently known, however, no operable anhydrous reaction system has been proposed in which the inter se condensation of aryl chloroformates to form diaryl carbonates.

It is therefore the general object of the present invention to provide a novel non-aqueous process for preparing diaryl carbonates in which the necessity for removal of large amounts of contaminating catalyst residues and reaction by products is avoided or at least greatly reduced.

This general object as well as other and more particular objects which will be obvious from the specification are accomplished in accordance with the process of this invention which comprises heating at elevated temperatures and in an anhydrous system an aryl monochloroformate or mixture of aryl monochloroformates in contact with a magnesium halide catalyst of the formula $$MgX_2$$

wherein X is fluorine, bromine, chlorine, or iodine. Preferably X is chlorine.

The aryl chloroformates, suitably employed in the present process have the general formula

$$Ar-O-\overset{O}{\underset{\|}{C}}-Cl$$

wherein Ar represents a monovalent aromatic radical free of substituent groups reactive in the reaction system employed. Thus Ar can be unsubstituted phenyl, α-naphthyl, β-naphthyl, anthryl, or phenanthryl radical, or any of these radicals which contain one or more inert ring substituents free of acetylenic unsaturation as for example alkyl such as methyl, ethyl, propyl, butyl, isopropyl, amyl, octyl; alkenyl such as ethenyl, propenyl; aryl, such as phenyl, methylphenyl, naphthyl, chlorophenyl, ethyl chlorophenyl, halogen such as chlorine, bromine, fluorine; nitro; oxyalkyl such as oxymethyl, oxyhexyl; cycloalkyl such as cyclobutyl, cyclopentyl, cyclohexyl, and the like.

Preferably the aryl chloromormates to the general formula (I)

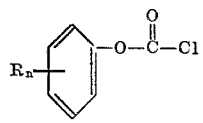

wherein R is a monovalent hydrocarbon radical free of aliphatic unsaturation and containing from 1 to 10 carbon atoms and $n$ has a value of from 0 to 4 inclusive. Most particularly preferred are those species conforming to structural Formla I above wherein R is an alkyl group containing from 1 to 3 carbon atoms and $n$ has a value of from 0 to 1.

Concentration values for the magnesium halide catalyst is not narrowly critical, but in general from about 0.1 to about 5 moles of magnesium halide per mole of aryl chloroformate provides adequate catalytic action. Preferably from about 0.1 to about 1 mole magnesium halide per mole of aryl chloroformate reactant is employed.

The inter se condensation of the aryl chloroformate can be suitably carried out in bulk or in a system containing an inert organic reaction medium. Typical of the numerous inert organic solvents serving as reaction media are benzene, xylene, chlorobenzene, o-dichlorobenzene, carbon tetrachloride, chloroform, methylene chloride, sym.-tetrachloroethane, toluene, and the like.

The temperature at which the present process is carried out is critical with respect to the maximum value, but not narrowly critical with respect to the minimum value. At temperatures higher than about 250° C. the magnesium halide has been found to catalyze the destruction of the diaryl carbonate product, thereby rendering the process in effect inoperable. Thus although optimum temperature values will vary depending upon the particular aryl chloroformate species present in the reaction system, in no case should the temperature be allowed to exceed 250° C. Preferably reaction temperatures are between about 30° C. and 150° C., although it will be obvious that where appreciable reaction rates result at lower temperatures with certain species, such temperatures are within the proper scope of the invention.

The present invention is more clearly understod by reference to the following examples which are merely illustrative and are not intended to be in any way limitative thereof.

*Example I*

In a glass reactor equipped with a stirrer and thermometer and heated by means of an external oil bath, a mixture of 5 grams (0.032 mole) phenyl chloroformate and 3.03 grams (0.032 mole) fused magnesium chloride was heated at 180° C. for a period of 20 hours. A rapid evolution of phosgene occurred during the heating period. After cooling, the solidified mixture was extracted with hot heptane and filtered. Concentration of the filtrate followed by cooling produced crystalline diphenyl carbonate in a yield of about 93% M.P. range=75.5–79° C.

*Example II*

Di-o-cresyl carbonate is prepared by charging to a reactor equipped with a thermometer, stirring means, heating means, and a reflux condenser, a mixture of 50 grams o-cresyl chloroformate, 4.0 grams magnesium bromide and 250 ml. o-dichlorobenzene, and heating the mixture at reflux for a period of about 15 hours. After cooling, the reaction mass is filtered, and the filtrate evaporated to dryness under vacuum to yield di-o-cresyl carbonate.

*Example III*

Ortho-cresylnaphthyl carbonate is prepared in accordance with the formulation and procedure set forth in Example II except that an equimolar mixture of o-cresyl chloroformate and α-naphthyl chloroformate is employed instead of a pure o-cresyl chloroformate.

The diaryl carbonates prepared in accordance with the present process find extensive use as carbonate precursors in the preparation of polycarbonate resins by the method well known as ester interchange.

What is claimed is:

1. The process for preparing a diaryl carbonate which comprises heating to a temperature not greater than about 250° C. an aryl monochloroformate having the general formula $$Ar-O-\overset{O}{\underset{\|}{C}}-Cl$$

wherein Ar is selected from the group consisting of aryl and aryl substituted by a member selected from the group consisting of alkyl, alkenyl, aryl, halogen, nitro, oxyalkyl, and cycloalkyl in contact with a catalytic amount of a magnesium halide having the formula $$MgX_2$$

wherein X is a halogen.

2. Process according to claim 1 wherein the aryl monochloroformate has the general formula

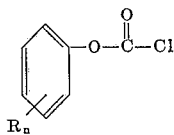

wherein R is a monovalent hydrocarbon radical free of acetylenic unsaturation and containing from 1 to 10 carbon atoms and $n$ has a value of from 0 to 4 inclusive.

3. Process according to claim 2 wherein $n$ has a value of zero.

4. Process according to claim 2 wherein the magnesium halide is $MgCl_2$.

5. Process according to claim 2 wherein the magnesium halide is $MgBr_2$.

6. Process according to claim 2 wherein the magnesium halide is present in an amount of from about 0.1 to about 5 moles per mole of aryl monochloroformate present.

7. Process according to claim 6 wherein the magnesium halide is present in an amount of from about 0.1 to about 1.0 mole per mole of aryl monochloroformate present.

8. Process for preparing a diaryl carbonate which comprises heating at a temperature of from about 30° C. to about 150° C. an aryl monochloroformate having the general formula $$Ar-O-\overset{O}{\underset{\|}{C}}-Cl$$

wherein Ar is selected from the group consisting of aryl and aryl substituted by a member selected from the group consisting of alkyl, alkenyl, aryl, halogen, nitro, oxyalkyl, and cycloalkyl in contact with a magnesium halide and an inert organic solvent medium, said magnesium halide being present in an amount of from about 0.1 to about 1.0 mole per mole of aryl monochloroformate.

9. Process according to claim 8 wherein the magnesium halide is $MgCl_2$, the aryl monochloroformate is phenyl chloroformate and the inert organic solvent is o-dichlorobenzene.

References Cited by the Examiner

Bowden et al., Chem. Soc. Jour., Part I, pp. 314–317 (1939).

CHARLES B. PARKER, *Primary Examiner.*